US006342652B1

(12) United States Patent
Harada et al.

(10) Patent No.: US 6,342,652 B1
(45) Date of Patent: Jan. 29, 2002

(54) WATER-SWELLABLE CROSSLINKED POLYMER, ITS COMPOSITION, AND THEIR PRODUCTION PROCESSES AND USES

(75) Inventors: Nobuyuki Harada, Suita; Toshimasa Kitayama; Yoshifumi Adachi, both of Himeji, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/643,651

(22) Filed: Aug. 21, 2000

(30) Foreign Application Priority Data

Sep. 1, 1999 (JP) ............................................. 11-248043

(51) Int. Cl.$^7$ ........................ A61F 13/15; C08F 283/02; C08G 64/48
(52) U.S. Cl. ........................ 604/358; 604/367; 604/368; 604/372; 604/378; 525/419; 525/437; 428/308.4; 428/339; 428/500
(58) Field of Search ................................ 604/358, 367, 604/368, 372, 378; 525/419, 437; 428/308.4, 339, 500

(56) References Cited

U.S. PATENT DOCUMENTS

| 4,818,598 A | 4/1989 | Wong ........................ 428/284 |
| 5,274,018 A | 12/1993 | Tanaka et al. .............. 524/166 |
| 5,780,616 A | 7/1998 | Fornasari et al. ............. 536/30 |
| 6,072,101 A | * 6/2000 | Beihoffer et al. ........... 604/372 |

FOREIGN PATENT DOCUMENTS

| EP | 0949290 | 10/1999 |
| JP | 481468 | 3/1992 |
| WO | 9220735 | 11/1992 |
| WO | 9522358 | 8/1995 |
| WO | 9615154 | 5/1996 |
| WO | 9617681 | 6/1996 |
| WO | 9748732 | 12/1997 |
| WO | 9824832 | 6/1998 |
| WO | 9837149 | 8/1998 |
| WO | 9925393 | 5/1999 |
| WO | 9934843 | 7/1999 |
| WO | 0009612 | 2/2000 |

\* cited by examiner

Primary Examiner—Samuel A. Acquah
(74) Attorney, Agent, or Firm—Roylance, Abrams, Berdo & Goodman, L.L.P.

(57) ABSTRACT

The present invention provides a water-swellable crosslinked polymer composition which comprises an anionic crosslinked polymer and a cationic crosslinked polymer, and is excellent in the desalting property and further in the absorption properties under load, and is therefore highly practicable. In a water-swellable crosslinked polymer composition which is particulate and comprises a cationic crosslinked polymer and an anionic crosslinked polymer, the improvement satisfies the following requirements (1) and/or (2):

(1) At least either one of the cationic crosslinked polymer and the anionic crosslinked polymer has a bulk density of not more than 0.5 g/ml.
(2) The water-swellable crosslinked polymer composition has a bulk density of not more than 0.5 g/ml.

21 Claims, 3 Drawing Sheets

Amount (mol % relative to monomer(s)) of crosslinking agent in anionic crosslinked polymer Examples 1 to 4 (water-swellable crosslinked polymer compositions (1) to (4))

Comparative Examples 1 to 4 (water-swellable crosslinked polymer compositions (5) to (8))

Fig. 4

Amount (mol % relative to monomer(s)) of crosslinking agent in anionic crosslinked polymer Examples 1 to 4 (water-swellable crosslinked polymer compositions (1) to (4))

Comparative Examples 1 to 4 (water-swellable crosslinked polymer compositions (5) to (8))

WATER-SWELLABLE CROSSLINKED POLYMER, ITS COMPOSITION, AND THEIR PRODUCTION PROCESSES AND USES

BACKGROUND OF THE INVENTION

A. Technical Field

The present invention relates to a water-swellable crosslinked polymer composition and its production process, more specifically, a water-swellable crosslinked polymer composition and its production process wherein the water-swellable crosslinked polymer composition comprises an anionic crosslinked polymer and a cationic crosslinked polymer and has a bulk density in a specific range. The present invention further relates to a water-swellable crosslinked polymer and its production process wherein the water-swellable crosslinked polymer is to easily give the above water-swellable crosslinked polymer composition. The present invention still further relates to uses of the above water-swellable crosslinked polymer composition.

B. Background Art

In recent years, synthetic water-absorbing materials, which are called water-absorbent resins, have been developed and are being put to practical use not only as constituent materials of sanitary materials such as sanitary napkins and disposable diapers, but also for purposes which need the water-absorbent resin, for example, industrial purposes such as sealing materials, dewfall-preventive materials, freshness-keeping materials, and solvent-dehydrating materials, and water-holding purposes in such as tree planting, agriculture, and horticulture.

As to the above water-absorbent resin, many ones as obtained by giving a crosslinked structure to hydrophilic high-molecular compounds are known, and examples thereof include: partially-neutralized and crosslinked poly (acrylic acids); hydrolyzed graft polymers of starch-acrylonitrile; neutralized graft polymers of starch-acrylic acid; saponified copolymers of vinyl acetate-acrylic acid ester; hydrolyzed copolymers of acrylonitrile or acrylamide, or crosslinked polymers of these hydrolyzed copolymers; and crosslinked polymers of polyethylenimine.

Furthermore, WO 92/20735 discloses a technical fundamental conception about absorption of electrolyte solutions by combinations of polymer particles having two different ions and exhibiting the ion exchangeability, and examples of application of this technique are disclosed in JP-A-081468/ 1992, WO 98/24382, WO 98/37149, and WO 99/25393. These techniques are, for example, such that an anionic water-swellable crosslinked polymer particle is combined with a cationic water-swellable crosslinked polymer particle to form a neutralized structure from an acid group of the former polymer particle and a basic group of the latter polymer particle by the salts which absorbing solutions contain, with the result that each of these polymer particles becomes so water-swellable that the combination of these polymer particles can exhibit more excellent swellability than conventional neutralized water-absorbent resins, and further can also take electrolytes (which are problems to the conventional neutralized water-absorbent resins) in to prevent the salt effect and, as a result, can enhance the ability to absorb the electrolyte solutions much more than conventional cases.

However, the above WO 92/20735, WO 98/24382, and WO 98/37149 merely disclose technical fundamental conceptions about combinations of polymer particles, and never consider absorption properties in practical use. In addition, WO 99/25393 proposes forming a microdomain in the polymer particles for the purpose of improving the absorption properties, but this case is found to contrarily deteriorate the desalting effect. The efficiency in the use of water-absorbing materials is important particularly for practical use of such as disposable diapers, therefore the diffusibility of liquids and further the properties of absorbing the electrolyte solution are more important; nevertheless this respect is not taken into consideration in the above prior arts at all. Thus, in the case where the above prior arts are intactly applied to such as disposable diapers, there are problems in respect to such as absorption rate, absorption capacity, and liquid permeability, therefore a satisfactory product is not obtained.

SUMMARY OF THE INVENTION

A. Objects of the Invention

An object of the present invention is to provide a water-swellable crosslinked polymer composition and its production process wherein the water-swellable crosslinked polymer composition comprises an anionic crosslinked polymer and a cationic crosslinked polymer, and is excellent in the desalting property and further in the absorption properties under load, and is therefore highly practicable. Another object of the present invention is to provide: a water-swellable crosslinked polymer and its production process wherein the water-swellable crosslinked polymer is to easily give the above water-swellable crosslinked polymer composition; and further, uses of the above water-swellable crosslinked polymer composition.

B. Disclosure of the Invention

In order to solve the above problems, the present invention provides the following:

(1) A water-swellable crosslinked polymer composition, which is particulate and comprises an anionic crosslinked polymer and a cationic crosslinked polymer, with the water-swellable crosslinked polymer composition being characterized by having a bulk density of not more than 0.5 g/ml.

(2) A water-swellable crosslinked polymer composition, which is particulate and comprises an anionic crosslinked polymer and a cationic crosslinked polymer, with the water-swellable crosslinked polymer composition being characterized in that at least either one of the anionic crosslinked polymer and the cationic crosslinked polymer has a bulk density of not more than 0.5 g/ml.

(3) A particulate cationic crosslinked polymer, which has a bulk density of not more than 0.5 g/ml and exhibits an absorption capacity of at least 5 g/g for physiological saline solution without load.

(4) A production process for a water-swellable crosslinked polymer, which comprises the step of carrying out a crosslinking reaction of a solution under bubbles-containing conditions wherein the solution contains at least a water-soluble polymer and a crosslinking agent.

(5) A production process for a water-swellable crosslinked polymer composition, which comprises the steps of: carrying out a crosslinking reaction of a solution under bubbles-containing conditions to obtain a cationic crosslinked polymer wherein the solution contains at least a polyamine and a crosslinking agent; and then mixing the resultant cationic crosslinked polymer and an anionic crosslinked polymer together.

(6) An absorbent articles, which comprises an absorbent layer, a sheet with liquid permeability, and a sheet with liquid impermeability, wherein the absorbent layer contains the above water-swellable crosslinked polymer composition according to the present invention, and is interposed between the sheet with liquid permeability and the sheet with liquid impermeability.

These and other objects and the advantages of the present invention will be more fully apparent from the following detailed disclosure.

DETAILED DESCRIPTION OF THE INVENTION

The water-swellable crosslinked polymer composition, according to the present invention, comprises a cationic crosslinked polymer and an anionic crosslinked polymer, and satisfies the following requirements (1) and/or (2):

(1) At least either one of the cationic crosslinked polymer and the anionic crosslinked polymer has a bulk density of not more than 0.5 g/ml, preferably not more than 0.4 g/ml.

(2) The water-swellable crosslinked polymer composition has a bulk density of not more than 0.5 g/ml, preferably not more than 0.4 g/ml.

Incidentally, the "bulk density" in the present invention is a mass per unit volume of a sample, and has the same meaning as those of common terms such as apparent density and bulk specific gravity. In the present invention, the measurement of the "bulk density" is carried out in accordance with the Japanese Industrial Standard (JIS) K3362 8.2.

The reduction of the bulk density to the above small value enlarges the surface area of the particles, therefore the desalination and the neutralization rapidly occur due to the ion exchange by the cationic crosslinked polymer and the anionic crosslinked polymer, with the result that the absorption rate under load is enhanced. In addition, the above low bulk density enhances the liquid permeability in the initial stage of the water absorption and, as a result, also enhances the saturated absorption capacity value (absorption quantity). Just for the purpose of enlarging the surface area, it is enough to render the particle diameter small. However, just to simply render the particle diameter small involves enhancing the bulk density and therefore deteriorating the liquid permeability. In addition, in the above prior arts as disclosed in WO 92/20735, JP-A-081468/1992, WO 98/24382, and WO 98/37149, irregular pulverized polymer particles are combined with each other. Furthermore, in the above prior art as disclosed in WO 99/25393, kneading is repeated with an extruder until the microdomain is formed. Thus, any polymer particle resultant from these prior arts has a bulk density of more than 0.5 g/ml.

Thus, the present inventors found that, in the present invention, both the fast liquid permeation rate and the fast absorption rate under load can be achieved by using the cationic or anionic crosslinked polymer having a small bulk density and a large surface area or the composition comprising a mixture of these crosslinked polymers.

The cationic crosslinked polymer, as used in the present invention, is preferably such that 50 to 100 mol % of basic groups which are contained in functional groups in molecules of this polymer are unneutralized basic groups, and examples thereof include those which are crosslinked slightly to such an extent that they can exhibit the water-swellability and be water-insoluble, specifically, crosslinked polymers of polyalkyleneamines, crosslinked polymers of polyvinylamines, crosslinked polymers of polyallylamines, crosslinked polymers of poly(N-vinylimidazoles), crosslinked polymers of polyvinylpyridines, crosslinked polymers of poly(vinylpyridineamine oxides), crosslinked polymers of polydiallylamines, crosslinked polymers of polyamidepolyamines, crosslinked polymers of poly (dimethylaminoalkyl acrylates), crosslinked polymers of poly(dimethylaminoalkyl methacrylates), crosslinked polymers of polydimethylaminoalkylacrylamides, crosslinked polymers of polydimethylaminoalkylmethacrylamides, crosslinked polymers of polyamidines, crosslinked polymers of poly(hydrazineacrylic acids), crosslinked polymers of asparagic acid-hexamethylenediamine polycondensation products, crosslinked polymers of basic poly(amino acids) (e.g. polylysine), crosslinked polymers of chitosan, and copolymers of these polymers. Among them, particularly preferable ones are crosslinked polymers of polyethylenimines, crosslinked polymers of polyallylamines, and their derivatives, and especially preferable ones are the crosslinked polymers of polyethylenimines.

The cationic crosslinked polymer, as used in the present invention, is obtainable by a process including the step of crosslinking the corresponding cationic polymer with a crosslinking agent having at least two groups which are to react with a functional group (e.g. amino (amine) group) of the cationic polymer to thereby form a covalent bond, thus introducing a crosslinked structure into the cationic polymer. When the above functional group of the cationic polymer is an amino (amine) group, usable examples of the crosslinking agent include conventional compounds which have, per molecule, at least two groups such as epoxy groups, aldehyde groups, haloalkyl groups, isocyanate groups, carboxyl groups, acid anhydride groups, acid halide groups, ester bonding moieties, and active double bonds. Specific examples of such a crosslinking agent include: bisepoxy compounds; epichlorohydrin; dihalides such as dibromoethylene; formalin; dialdehyde compounds such as glyoxal; diglycidyl ethers of (poly)ethylene glycols, diglycidyl ethers of (poly)propylene glycols, diglycidyl ethers of dihydric alcohols (e.g. neopentyl glycol), polyglycidyl ethers of glycerol; ($\alpha,\beta$-unsaturated carboxylic acid esters such as methyl acrylate and ethyl acrylate; $\alpha,\beta$-unsaturated carboxylic acids such as acrylic acid; di-$\alpha,\beta$-unsaturated carbonyl compounds such as N,N'-methylenebisacrylamide; and $\alpha,\beta$-alkylene diisocyanates. However, there is no limitation thereto. The kind and the amount of the crosslinking agent are selected in view of factors such as absorption capacity or strength of the resultant cationic crosslinked polymer, but, when the cationic polymer is a polymer containing an amino (amine) group, the amount of the crosslinking agent is preferably in the range of 0.001 to 20 mol % of the amine units of the polymer. In the case where the amount of the crosslinking agent is smaller than 0.001 mol %, the absorption capacity of the resultant cationic crosslinked polymer is low, and further, its strength is insufficient. In the case where the amount of the crosslinking agent is larger than 20 mol %, the absorption capacity might greatly be lowered.

The crosslinked polymer of polyethylenimine is producible by a process including the step of crosslinking a polymer of polyethylenimine which is in a state diluted with a solvent or in a state of an aqueous solution or in a solvent-free state. However, for the safety, it is preferable that the polymer of polyethylenimine which is in a state of an aqueous solution is crosslinked. In addition, for preventing the physical properties from deteriorating due to drying after crosslinking, or for simplifying the drying step, it is desirable to produce a polymer of polyethylenimine having a high solid content, and the solid content of the polymer of polyethylenimine which is in a state of an aqueous solution is preferably not lower than 80 weight %, more preferably not lower than 90 weight %, most preferably not lower than 95 weight %.

The anionic crosslinked polymer, as used in the present invention, is preferably such that 50 to 100 mol % of acid groups which are contained in functional groups in molecules of this polymer are unneutralized acid groups, and examples thereof include those which are crosslinked slightly to such an extent that they can exhibit the water-swellability and be water-insoluble, specifically, homo- or copolymers of acid-group-containing polymerizable monomers, such as crosslinked polymers of poly(acrylic acids). Examples of the acid-group-containing polymerizable monomers include: carboxyl-group-containing polymerizable monomers such as acrylic acid, methacrylic acid, ethacrylic acid, crotonic acid, sorbic acid, maleic acid, itaconic acid, cinnamic acid, and their anhydrides; sulfonic-acid-group-containing polymerizable monomers such as vinylsulfonic acid, allylsulfonic acid, styrenesulfonic acid, vinyltoluenesulfonic acid, 2-(meth)acrylamido-2-methylpropanesulfonic acid, 2-(meth)acryloylethanesulfonic acid, and 2-(meth)acryloylpropanesulfonic acid; and phosphoric-acid-group-containing polymerizable monomers such as 2-hydroxyethylacryloyl phosphate, 2-hydroxyethylmethacryloyl phosphate, phenyl-2-acryloyloxyethyl phosphate, and vinyl phosphate. Among them, particularly preferable ones are crosslinked polymers of poly(acrylic acids), crosslinked polymers of poly(maleic acids), and their derivatives.

In the present invention, the cationic crosslinked polymer and the anionic crosslinked polymer are used in a form where preferably at least 70 mol %, more preferably 100 mol %, of the acid or basic groups of each polymer are unneutralized and free.

For requirement (1) above, it is enough that at least either one of the cationic crosslinked polymer and the anionic crosslinked polymer has a bulk density of not more than 0.5 g/ml, and this includes the following three cases:

(i) a case where both of the cationic crosslinked polymer and the anionic crosslinked polymer have a bulk density of not more than 0.5 g/ml;

(ii) a case where the cationic crosslinked polymer has a bulk density of not more than 0.5 g/ml and where the anionic crosslinked polymer has a bulk density of more than 0.5 g/ml; and (iii) a case where the anionic crosslinked polymer has a bulk density of not more than 0.5 g/ml and where the cationic crosslinked polymer has a bulk density of more than 0.5 g/ml.

In view of the ease of the production, however, it is preferable that the cationic crosslinked polymer has a bulk density of not more than 0.5 g/ml, and case (ii) above is the simplest. Particularly, it is preferable that particles of crosslinked polymers of polyethylenimines having a bulk density of not more than 0.5 g/ml are used as the cationic crosslinked polymer.

The crosslinked polymer of polyethylenimine has so low a glass transition temperature as to be very difficult to subject to treatments such as pulverization at room temperature after drying. Therefore, special treatments such as freeze-drying are needed for obtaining its irregular pulverized particles. In addition, even if the pulverization is carried out by such a special treatment, the resultant particles tend to cohere if they are left as they are. Therefore, usually, their surfaces need to be coated with inorganic fine particles such as silica. On the other hand, the crosslinked polymer of polyethylenimine can be formed into aggregated particles having a bulk density in the aimed range by subjecting the crosslinked polymer of polyethylenimine to a process including the steps of pulverizing the crosslinked polymer of polyethylenimine beforehand in the stage of its hydrogel to divide it into very fine pieces (e.g. their particle diameters are not larger than 850 μm), and then drying them, and then adding thereto a small amount of inorganic fine particles (such as silica) or surfactant, and then pulverizing the resultant mixture. The resultant aggregate usually has a bulk density of not more than 0.5 g/ml, therefore crosslinked polymer particles having a bulk density of not more than 0.5 g/ml are obtainable in a very economical and practical manner.

Examples of other production processes for cationic or anionic crosslinked polymer particles having a bulk density of not more than 0.5 g/ml include a process including the step of carrying out a reaction of a solution under bubbles-containing conditions wherein the solution contains a water-soluble polymer and a crosslinking agent, and more specific examples of such a process include: a process including the steps of beforehand adding a compound, which can generate a gas by heating, to a cationic or anionic water-soluble polymer along with a crosslinking agent, and then heating the resultant mixture to cause foaming simultaneously with crosslinking, thus obtaining a crosslinked polymer having a low density; and a process including the steps of crosslinking a mixture of a cationic or anionic water-soluble polymer or a cationic or anionic polymerizable monomer containing a polymerization initiator with a crosslinkable compound in an aqueous solution of this mixture in a state where an inert gas is dispersed in this aqueous solution, or crosslinking the above mixture simultaneously with its polymerization, thus obtaining a crosslinked polymer having a low density.

The process including the step of carrying out a reaction between a water-soluble polymer and a crosslinking agent under bubbles-containing conditions may be the above-exemplified ones, but a particularly preferable example thereof is a process including the step of carrying out a crosslinking reaction between a viscous water-soluble polymer and a crosslinking agent under bubbles-containing conditions, because, also in view of the production cost, such a process enables the stable production at a low cost. For stabilizing the bubbles-containing conditions in this process, it is desirable to control the viscosity, and this viscosity control is, for example, carried out by a method in which the molecular weight, molecular composition, or high-molecular structure of the water-soluble polymer is controlled, or a method in which the temperature or pressure is adjusted, or a method in which an additive is added. However, a method in which the solid content of the aqueous solution is adjusted is preferable as a simple method, wherein how high solid content is preferable is different according to the viscosity of the polymer solution, but the solid content is preferably not lower than 5 weight %, more preferably not lower than 30 weight %, still more preferably not lower than 50 weight %, most preferably not lower than 80 weight %. In the case where the solid content is lower than 5 weight %, there are disadvantages in that the yield resultant from drying is low. The viscosity of the polymer solution is preferably not lower than 2 mPa·s, more preferably not lower than 100 mPa·s, still more preferably not lower than 1,000 mPa·s, most preferably not lower than 10,000 mPa·s. The weight-average molecular weight of the polymer which is contained in the polymer solution is preferably not lower than 1,000, more preferably not lower than 10,000, most preferably not lower than 1,000,000. The neutralization ratio of the polymer which is contained in the polymer solution is preferably lower than 75 mol %, more preferably lower than 50 mol %, still more preferably lower than 30 mol %, most preferably lower than 10 mol %. The degree of reduced pressure in the above method in which the pressure is adjusted is preferably not higher than 750 mmHg, more preferably not higher than 200 mmHg, most preferably not higher than 100 mmHg. The volume expansivity of the bubbles-containing volume to the original volume is preferably not lower than 0.1%, more preferably not lower than 0.5%, still more preferably not lower than 10%, most preferably not lower than 50%.

The mixer, which is used to mix the water-soluble polymer and the crosslinking agent together while whipping them, is not especially limited, but conventional ones such as motor-driven rotating stirrers, high-speed stirrers (e.g. homogenizers (produced by Nihonseiki Kaisha Ltd.)), and whisks (e.g. Whip Auto (produced by Aikosha Seisakusho K.K.)) are also usable according to the aimed bulk density. In addition, the pressure upon the whipped aqueous polymer solution can be adjusted as a method to adjust the bulk density of the crosslinked polymer. For example, crosslinking the crosslinking-agent-mixed aqueous polymer solution under reduced pressure after being whipped can produce any crosslinked polymer having a lower bulk density than that obtained by crosslinking under normal pressure. In addition, uniform whipping enables easy pulverization of even a high-concentrated crosslinked polymer.

The crosslinked hydropolymer as produced in the above way is used after it has been dried and then pulverized if necessary.

The present inventors are the first finders of the above production process for a water-swellable crosslinked polymer which comprises the step of carrying out a crosslinking reaction of a solution under bubbles-containing conditions wherein the solution contains a water-soluble polymer and a crosslinking agent. The present invention further provides this production process. In this production process, the resulting water-swellable crosslinked polymer having a low bulk density exhibits an absorption capacity of preferably at least 3 g/g, more preferably at least 5 g/g, for physiological saline solution without load. In addition, the water-swellable crosslinked polymer obtained by this production process is usable as the cationic crosslinked polymer and/or the anionic crosslinked polymer in the water-swellable crosslinked polymer composition according to the present invention, but is also usable alone.

When the water-swellable crosslinked polymer composition according to the present invention is produced using the cationic crosslinked polymer and the anionic crosslinked polymer, a water-swellable crosslinked polymer composition having high physical properties is obtainable by carrying out a crosslinking reaction in the above way with a polyamine used as the cationic polymer (water-soluble polymer). Thus, the present invention further provides a production process for a water-swellable crosslinked polymer composition which comprises the steps of: carrying out a crosslinking reaction of a solution under bubbles-containing conditions to obtain a cationic crosslinked polymer wherein the solution contains at least a polyamine and a crosslinking agent; and then mixing the resultant cationic crosslinked polymer and an anionic crosslinked polymer together.

In addition, if a polyethylenimine polymer which does not solidify even in a state of high solid content is used, then a cationic crosslinked polymer having so low a bulk density as not to need the drying step can also be obtained directly.

Incidentally, water-swellable crosslinked polymer particles of the irregular pulverized shape, which are obtained by drying and then pulverizing a hydrogel resultant from conventional aqueous solution polymerization, usually have a bulk density of more than 0.5 g/ml.

In addition, the present inventors are the first finders of the cationic crosslinked polymer which has a bulk density of not more than 0.5 g/ml and is water-swellable and can absorb several times as large a quantity of physiological saline solution as its own weight. The present invention further provides such a cationic crosslinked polymer having a bulk density of not more than 0.5 g/ml and exhibiting an absorption capacity of at least 5 g/g for physiological saline solution without load.

In the present invention, as to the respective particle diameters of the cationic crosslinked polymer and the anionic crosslinked polymer, not less than 90 weight % of each polymer has a particle diameter in the range of preferably 850 to 100 μm, more preferably 500 to 150 μm.

In addition, the weight ratio of the cationic crosslinked polymer to the anionic crosslinked polymer in the present invention is in the range of preferably 10/90 to 90/10, more preferably 20/80 to 80/20, still more preferably 30/70 to 70/30, particularly preferably 40/60 to 60/40, in view of enablement to display the utmost desalination effect and to display high absorbency for electrolyte solutions.

The water-swellable crosslinked polymer composition having a bulk density of not more than 0.5 g/ml, which satisfies requirement (2) above, is easily obtainable by arranging for at least either one of the cationic crosslinked polymer and the anionic crosslinked polymer to have a bulk density of not more than 0.5 g/ml in accordance with requirement (1) above, and it is enough to arrange that the bulk density will not be more than 0.5 g/ml over the whole composition in consideration of the respective bulk densities of the anionic crosslinked polymer and the cationic crosslinked polymer and the weight ratio between these polymers.

In addition, the water-swellable crosslinked polymer composition having a bulk density of not more than 0.5 g/ml, which satisfies requirement (2) above, is producible also by a process including the step of mixing finely-pulverized particles of the cationic crosslinked polymer and finely-pulverized particles of the anionic crosslinked polymer together, for example, in the presence of a binder of which the amount is in the range of 1 to 30 wt %, thereby aggregating and granulating them while forming a polyion complex on their surfaces. However, conventional mixing granulation processes result in a high bulk density, and it is therefore difficult for such conventional mixing granulation processes to give the water-swellable crosslinked polymer according to the present invention.

The water-swellable crosslinked polymer composition, according to the present invention, is obtainable by a process including the step of mixing together the cationic crosslinked polymer and the anionic crosslinked polymer, and further, if necessary, another additive. Examples of methods for mixing the cationic crosslinked polymer and the anionic crosslinked polymer together include: a so-called dry-blending method in which both polymers are mixed together in a state where both are dried products; and a so-called gel-blending method in which either one of the polymers is formed into a dry powder, and this dry powder and a (pulverized) gel of the other polymer are mixed together and then pulverized, or in which both polymers are mixed together, in a state where both are gels, and then dried. However, the gel-blending method increases the degree of close contact between particles to result in a high bulk density, therefore the dry-blending method is preferable. Examples of mixers therefor include kneaders, almighty mixers, extruders, Nauta mixers, ribbon mixers, paddle mixers, air mixers, and conical blenders. Incidentally, the "dried product", as referred to in the present invention, is defined as what is in a state where its water content is less than 20 weight % (its solid content is more than 80 weight %). On the other hand, the "gel" is defined as what is in a state where its water content is not less than 20 weight % (its solid content is not more than 80 weight %).

The water-swellable crosslinked polymer composition, according to the present invention, may further comprise an additive (e.g. dispersant including inorganic fine particles such as silica) other than the cationic crosslinked polymer and the anionic crosslinked polymer, but needs to be particulate. The total amount of the cationic crosslinked polymer and the anionic crosslinked polymer in the water-swellable crosslinked polymer composition is preferably not smaller than 95 weight %, more preferably not smaller than 99 weight %.

The absorption capacity of the water-swellable crosslinked polymer composition according to the present invention under load is as follows: that in 4 hours is preferably not less than 20 g/g, more preferably not less than 30 g/g, most preferably not less than 40 g/g, and further, that in 20 hours is preferably not less than 30 g/g, more preferably not less than 40 g/g, most preferably not less than 45 g/g.

The absorption efficiency of the water-swellable crosslinked polymer composition according to the present invention under load is preferably not less than 1.0, more preferably not less than 1.2, most preferably not less than 1.5.

The absorption capacity of the water-swellable crosslinked polymer composition according to the present invention under load is as follows: each of a composition having particle diameters in the range of 850 to 500 μm, a composition having particle diameters in the range of 500 to 300 μm, and a composition having particle diameters of not larger than 300 μm exhibits an absorption capacity under load of preferably not less than 10 g/g in 0.083 hours or not less than 40 g/g in 20 hours.

The desalting amount of the water-swellable crosslinked polymer composition according to the present invention is preferably not less than 0.3 g/g, more preferably not less than 0.35 g/g, most preferably not less than 0.4 g/g.

The water-swellable crosslinked polymer composition, according to the present invention, can absorb various liquids such as water, body fluids, physiological saline solution, urine, blood, cement water, and fertilizer-containing water, and is therefore usable for absorbent articles which contain this composition. Such absorbent articles are useful for various industrial purposes which need water-absorption, water-holding, wetting, swelling, and gelation, for example, as follows: articles contacting human bodies, such as disposable diapers, sanitary napkins, and incontinent pads; materials to separate water from oil; other dehydrating or drying agents; water-holding materials for plants or soil; solidifiers for muddy sediment; dewfall preventives; sealing materials for electric wires or optical fibers; and sealing materials for engineering works or constructions.

The structure of the above absorbent articles is, for example, such that an absorbent layer containing the water-swellable crosslinked polymer composition according to the present invention is interposed between a sheet with liquid permeability and a sheet with liquid impermeability.

The above-mentioned sheet with liquid permeability is a sheet comprising a material that is permeable with aqueous liquids. Examples thereof include: nonwoven fabrics, woven fabrics; porous synthetic resin films of polyethylene, polypropylene, polyester, polyamide. In addition, the above-mentioned sheet with liquid impermeability is a sheet comprising a material that is impermeable with aqueous liquids. Examples thereof include: synthetic resin films of polyethylene, polypropylene, ethylene vinyl acetate, polyvinyl chloride; films of combined materials of these synthetic resins with nonwoven fabrics; films of combined materials of the above-mentioned synthetic resins with woven fabrics. Incidentally, the sheet with liquid impermeability may be permeable with vapor.

In addition, when the water-swellable crosslinked polymer composition according to the present invention is used for the absorbent article, a product by beforehand mixing the cationic crosslinked polymer and the anionic crosslinked polymer together in the aforementioned way may be used as the water-swellable crosslinked polymer composition, but it is also permissible to use the water-swellable crosslinked polymer composition according to the present invention in a form such that the cationic crosslinked polymer and the anionic crosslinked polymer will be mixed together when the absorbent article is produced.

Incidentally, it is permissible to give various functions to the water-swellable crosslinked polymer composition according to the present invention or the absorbent article by further adding materials, such as deodorants, antimicrobial agents, perfumes, various inorganic powders, foaming agents, pigments, dyes, hydrophilic short fibers, manure, oxidants, reductants, water, and salts, to the water-swellable crosslinked polymer composition according to the present invention.

(Effects and Advantages of the Invention):

Because the water-swellable crosslinked polymer composition according to the present invention comprises a combination of the anionic water-swellable crosslinked polymer particle with the cationic water-swellable crosslinked polymer particle, a neutralized structure is formed from an acid group of the former polymer particle and a basic group of the latter polymer particle in the above composition, with the result that each of these polymer particles becomes so water-swellable that the above composition can exhibit more excellent swellability than conventional neutralized water-absorbent resins, and further can also take electrolytes (which are problems to the conventional neutralized water-absorbent resins) in to prevent the salt effect and, as a result, can enhance the ability to absorb the electrolyte solutions much more than conventional cases. Furthermore, the above composition is a water-swellable crosslinked polymer composition which is excellent in the absorption properties under load and is therefore highly practicable.

The water-swellable crosslinked polymer according to the present invention easily gives the above water-swellable crosslinked polymer composition according to the present invention. And the production process for a water-swellable crosslinked polymer, according to the present invention, easily gives the above water-swellable crosslinked polymer according to the present invention.

The production process for a water-swellable crosslinked polymer composition, according to the present invention, easily gives the above water-swellable crosslinked polymer composition according to the present invention.

Because the absorbent article according to the present invention includes the above water-swellable crosslinked polymer composition according to the present invention as a component, this absorbent article is an article which is excellent in the absorption properties under load and is therefore highly practicable.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited thereto.

In the examples, unless otherwise noted, the units "part(s)" and "%" denote those by weight.

Incidentally, the physical properties of the water-swellable crosslinked polymer composition were measured in the following ways.

(a) Absorption capacity for physiological saline solution without load:

First, 0.2 g of crosslinked polymer particles were uniformly placed into a nonwoven-fabric-made bag (60 mm×60 mm) and then immersed into a 0.9 weight % aqueous sodium chloride solution (physiological saline solution). Sixty minutes later, the bag was drawn up and then drained at 250 G for 3 minutes with a centrifuge, and the weight W1 (g) of the bag was then measured. On the other hand, the same procedure was carried out without the crosslinked polymer particles, and the resultant weight W0 (g) was measured. Thus, the absorption capacity (g/g) without load was calculated in accordance with the following equation:

Absorption capacity (g/g) without load=(W1 (g)–W0 (g))/(weight (g) of crosslinked polymer particles)–1

Incidentally, when the absorption capacity without load in the present invention was measured, particles having particle diameters in the range of 500 to 300 μm were used.

(b) Absorption capacity under load:

First, 0.9 g of water-swellable crosslinked polymer composition was uniformly spread on a stainless wire gauze of 400 mesh (mesh opening size: 38 μm) as attached by fusion to the bottom of a plastic supporting cylinder with an inner diameter of 60 mm. Next, a piston and a load were mounted in sequence on the above water-swellable crosslinked polymer composition, wherein the piston had an outer diameter of only a little smaller than 60 mm and made no gap with the wall face of the supporting cylinder, but was not hindered from moving up and down, and wherein the total weight of the piston and the load were adjusted such that a load of 50 g/cm$^2$ could uniformly be applied to the water-swellable crosslinked polymer composition. Then, the weight (Wa) of the resultant set of measurement apparatus was measured.

A glass filter plate of 90 mm in diameter was mounted inside a Petri dish of 150 mm in diameter, and a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) was added up to the same level as the surface of the glass filter plate, on which filter paper of 90 mm in diameter was then mounted such that its entire surface would be wetted, and further, an excess of liquid was removed.

The above set of measurement apparatus was mounted on the above wet filter paper, thereby allowing the water-swellable crosslinked polymer composition to absorb the liquid under load. After the water-swellable crosslinked polymer composition had absorbed the liquid for a predetermined time, the set of measurement apparatus was lifted to measure its weight (Wb) again. Then, the absorption capacity under load was determined from the below-mentioned equation. The above measurement was carried out with the piston and the load still mounted. After the measurement of the weight had ended, the set of measurement apparatus was mounted on the above wet filter paper again, thereby allowing the water-swellable crosslinked polymer composition to absorb the salt water under load until the next predetermined time. Thereafter, the above operation was repeated to compare the saltwater absorption rate. The larger the saltwater absorption capacity as exhibited per unit time is, the faster the saltwater absorption rate is.

Absorption capacity (g/g) under load=(Wb (g)–Wa (g))/(weight (g) of water-swellable crosslinked polymer composition)

(c) Absorption efficiency under load and absorption capacity of upper, intermediate, and lower layers of gel under load:

The absorption efficiency under load was determined by a method as described in JP-A-265582/1998 as follows. Immediately after the above measurement of the absorption capacity under load had been carried out for 4 hours, the set of measurement apparatus was removed from the filter paper in a state where the water-swellable crosslinked polymer composition which had absorbed the salt water and swollen therewith (i.e. swollen gel) was present in the supporting cylinder and still carried the piston and the load. Then, the set of measurement apparatus was mounted on a stack of 10 pieces of filter paper of 90 mm in diameter (No. 2, produced by Advantech Toyo K.K.) for 2 minutes to remove the salt water which was present in the supporting cylinder and between swollen gel particles (gap salt water which had not been absorbed by the water-swellable crosslinked polymer composition). Then, weight Wc (g) was measured in a state where the swollen gel was present in the supporting cylinder and still carried the piston and the load. Weight Wd (g) of the supporting cylinder, which had been measured beforehand, and the total weight We (g) of the piston and the load were subtracted from Wc (g) to determine weight Wf (g) of the swollen gel from which the gap salt water had been removed.

Next, the piston and the load were removed from the supporting cylinder, and then the swollen gel in the supporting cylinder was got out every one-third of the weight Wf (g) of the swollen gel from the top to obtain upper, intermediate, and lower layers of the gel. The resultant upper layer of the gel was weighed out onto an aluminum cup and then dried at 180° C. for 3 hours, and then the weight of the resultant dried product was corrected by the solid content of the absorbed salt water to determine absorption capacity G1 (g/g) of the upper layer of the gel under load, when the absorption capacity of the gel under load was calculated on the assumption that 50% of the components of the salt water were taken into the water-swellable crosslinked polymer composition (on the assumption that the concentration of the salt water as taken into the water-swellable crosslinked polymer composition was 50% of the concentration of the original salt water).

The same procedure as the above was carried out also for the lower and intermediate layers of the gel to determine absorption capacity G2 (g/g) of the lower layer of the gel under load and an absorption capacity of the intermediate layer of the gel under load.

Then, the absorption efficiency under load was calculated in accordance with the following equation:

Absorption efficiency under load=G1/G2

(d) Bulk density:

The bulk density was determined by a method as described in the Japanese Industrial Standard (JIS) K3362 8.2. Incidentally, as to the measurement device, a bulk density meter (produced by Kuramochi Scientific Instrument Seisakusho K.K.) was used.

An amount of 120 ml of sample, which had been well-mixed to eliminate the unevenness according to the particle diameter distribution, was placed into a funnel with its damper closed. Immediately thereafter, the damper was opened to drop the sample into a receiver. A portion, as overbrimmed from the receiver, of the sample was scraped off with a glass rod. Then, the weight of the receiver containing the sample was measured with an accuracy to 0.1 g to calculate the bulk density in accordance with the below-mentioned equation. Incidentally, the bulk density was measured under conditions where the solid content (based on the moisture content) of the crosslinked polymer particles or water-swellable crosslinked polymer composition was higher than 80 weight % and where the temperature was 25±2° C., and where the relative humidity was in the range of 30 to 50%.

Bulk density (g/ml)=(C−A)/B where

A: weight (g) of the receiver
B: capacity of the receiver (ml)
C: weight (g) of the receiver when containing the sample (e) Solid content:

The weight of an aluminum dish of 50 mm in diameter was measured with an accuracy to 0.0001 g (the resultant weight was referred to as Wa). About 1 g of sample was weighed out with an accuracy to 0.0001 g (the resultant weight was referred to as Wb), and then uniformly spread out on the above aluminum dish, and then dried at 150° C. with a wind-free drying oven. After 1 hour, the sample was got out of the drying oven, and then left cooling in a decicator for about 10 minutes, and then weighed with an accuracy to 0.0001 g (the resultant weight was referred to as Wc). The solid content was calculated in accordance with the following equation:

Solid content (wt %)=(Wc−Wa)/Wb (f) Desalting amount:

First, 1.0 g of water-swellable crosslinked polymer composition was placed into 100 g of physiological saline solution (0.9 weight % aqueous sodium chloride solution) in a beaker of 200 ml and then gently stirred, thereby being swollen. After swelling for 4 hours, the liquid containing the swollen gel was filtered by suction, and the amount (g/g) of desalting by the gel was determined from amount W1 (g) of the separated filtrate and from sodium chloride concentration C1 (wt %) as determined from the electric conductivity of the filtrate.

Desalting amount (g/g)=0.9−W1×C1/100

EXAMPLE A-1

First, 1,000 g of 30% polyethylenimine (trade name: Epomin P-1000, produced by Nippon Shokubai Co., Ltd.) was placed into a beaker of 2 liters as furnished with a stirrer to stir the contents. Next, 30 g of ethylene glycol diglycidyl ether (trade name: Denacol EX-810, produced by Nagase Chemicals, Ltd.) (crosslinking agent) was added thereto under stirring. Then, the resultant mixture was stirred for 1 minute to obtain a homogeneous solution. Thereafter, the vessel was sealed, and then placed into an incubator of 60° C. to carry out a reaction. After 3 hours, the system temperature was cooled down to room temperature, and the resultant lumped gel was pulverized with a laboratory pulverizer into particle diameters of not larger than 850 μm. The resultant powdery hydrogel was dried at 60° C. with hot air for 2 hours, and then 0.9 g of inorganic fine particles (trade name: Aerosil R972, produced by Nippon Aerosil Co., Ltd.) were added to the resultant dried product, and they were well blended so that the inorganic fine particles could uniformly be dispersed. The resultant blend was pulverized with a laboratory pulverizer into particle diameters of not larger than 850 μm, thus obtaining cationic crosslinked polymer particles (A1). The 850-μm-passed yield was 96.5%. The crosslinked polymer particles (A1) exhibited an absorption capacity of 6.5 g/g for physiological saline solution without load. In addition, the crosslinked polymer particles (A1) comprised: particles of 850 to 500 μm in the ratio of 29.3%; particles of 500 to 300 μm in the ratio of 39.4%; particles of 300 to 150 μm in the ratio of 27.6%; and particles of not larger than 150 μm in the ratio of 3.7%. In addition, the solid content and the bulk density of the crosslinked polymer particles (A1) were measured, and their results are shown in Table 1.

EXAMPLE A-2

First, 1,000 g of 30% polyethylenimine (trade name: Epomin P-1000, produced by Nippon Shokubai Co., Ltd.) was placed into a beaker of 2 liters as furnished with a stirrer to stir the contents. Next, a crosslinking agent solution was added thereto under stirring, wherein the crosslinking agent solution was prepared by dissolving 18 g of N,N'-methylenebisacrylamide (produced by Nitto Chemical Industry Co., Ltd.) (crosslinking agent) into a mixed solvent of 100 g of pure water and 200 g of methanol. Then, the resultant mixture was stirred for 1 minute to obtain a homogeneous solution. Thereafter, the vessel was sealed, and then placed into an incubator of 60° C. to carry out a reaction. After 3 hours, the system temperature was cooled down to room temperature, and the resultant lumped gel was pulverized with a meat chopper with 2.4 mm aperture. The resultant powdery hydrogel was dried at 60° C. with hot air for 2 hours, and then 3 g of inorganic fine particles (trade name: Aerosil R972, produced by Nippon Aerosil Co., Ltd.) were added to the resultant dried product, and they were well blended so that the inorganic fine particles could uniformly be dispersed. The resultant blend was pulverized with a laboratory pulverizer into particle diameters of not larger than 850 μm, thus obtaining cationic crosslinked polymer particles (A2). The 850-μm-passed yield was 76.1%. The crosslinked polymer particles (A2) exhibited an absorption capacity of 9.2 g/g for physiological saline solution without load. In addition, the crosslinked polymer particles (A2) comprised: particles of 850 to 500 μm in the ratio of 54.3%; particles of 500 to 300 μm in the ratio of 33.8%; particles of 300 to 150 μm in the ratio of 11.3%; and particles of not larger than 150 μm in the ratio of 0.6%. In addition, the solid content and the bulk density of the crosslinked polymer particles (A2) were measured, and their results are shown in Table 1.

EXAMPLE A-3

Figure 1:
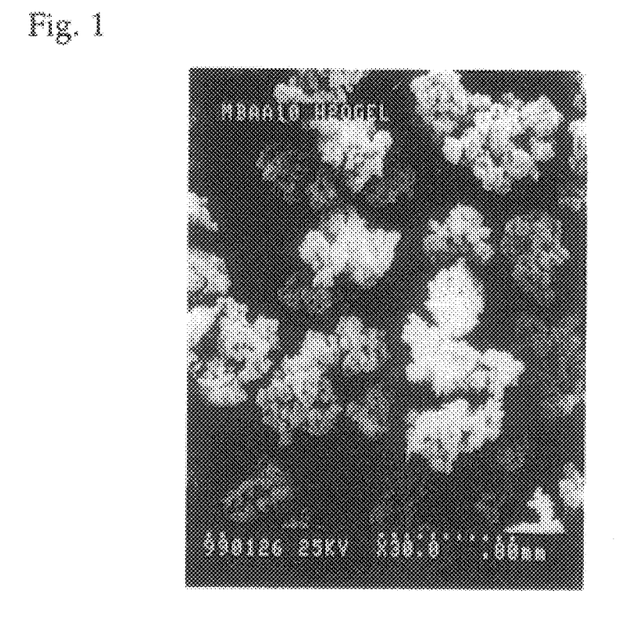
FIG. 1 is an electron photomicrograph (magnifications: 30.0) of the crosslinked polymer particles (A3) as obtained in Example A-3.

First, 1,000 g of 30% polyethylenimine (trade name: Epomin P-1000, produced by Nippon Shokubai Co., Ltd.) was placed into a beaker of 2 liters as furnished with a stirrer to stir the contents. Next, a crosslinking agent solution was added thereto under stirring, wherein the crosslinking agent solution was prepared by dissolving 30 g of N,N'-methylenebisacrylamide (produced by Nitto Chemical Industry Co., Ltd.) (crosslinking agent) into a mixed solvent of 200 g of pure water and 200 g of methanol. Then, the resultant mixture was stirred for 1 minute to obtain a homogeneous solution. Thereafter, the vessel was sealed, and then placed into an incubator of 60° C. to carry out a reaction. After 3 hours, the system temperature was cooled down to room temperature, and the resultant lumped gel was pulverized with a laboratory pulverizer into particle diameters of not larger than 850 μm. The resultant powdery hydrogel was dried at 60° C. with hot air for 2 hours, and then 0.9 g of inorganic fine particles (trade name: Aerosil R972, produced by Nippon Aerosil Co., Ltd.) were added to the resultant dried product, and they were well blended so that the inorganic fine particles could uniformly be dispersed. The resultant blend was pulverized with a laboratory pulverizer into particle diameters of not larger than 850 μm, thus obtaining cationic crosslinked polymer particles (A3). The 850-μm-passed yield was 98%. An electron photomicrograph of the crosslinked polymer particles (A3) is shown in FIG. 1. The crosslinked polymer particles (A3) exhibited an absorption capacity of 7.6 g/g for physiological saline solution without load. In addition, the crosslinked polymer particles (A3) comprised: particles of 850 to 500 μm in the ratio of 22.6%; particles of 500 to 300 μm in the ratio of 35.1%; particles of 300 to 150 μm in the ratio of 34.6%; and particles of not larger than 150 μm in the ratio of 7.7%. In addition, the solid content and the bulk density of the crosslinked polymer particles (A3) were measured, and their results are shown in Table 1.

COMPARATIVE EXAMPLE A-1

First, 600 ml of cyclohexane solution, containing 6 g of inorganic fine particles (trade name: Aerosil R972, produced by Nippon Aerosil Co., Ltd.), was placed into a separable flask of 2 liters with a dropping funnel, a stirrer, a thermometer, a reflux condenser, and a built-in baffle, and then stirred at room temperature. Next, a crosslinking agent solution, as prepared by dissolving 10.12 g of N,N'-methylenebisacrylamide (produced by Nitto Chemical Industry Co., Ltd.) (as the crosslinking agent) into a mixed solvent comprising 50 g of pure water and 100 g of methanol, was added under stirring to an aqueous hydrophilic high-molecular compound solution having been cooled to 0° C. beforehand and comprising 337.3 g of 30% polyethylenimine (trade name: Epomin P1000, produced by Nippon Shokubai Co., Ltd.) and 102.5 g of pure water, thus preparing an aqueous liquid containing a crosslinking agent and a hydrophilic high-molecular compound. Then, this solution was added to the above cyclohexane solution at room temperature under stirring. Under stirring, the temperature of the system was gradually raised to 65° C., and the reaction was carried out at 65° C. for 3 hours. Then, the temperature of the system was cooled to room temperature, and the resultant spherical hydrogel was filtrated by suction, and then not washed with water, but dried at 60° C. with hot air for 2 hours, thus obtaining cationic crosslinked polymer particles (A4). This crosslinked polymer particles (A4) exhibited an absorption capacity of 7.0 g/g for physiological saline solution without load. In addition, the crosslinked polymer particles (A4) comprised: particles of 850 to 500 μm in the ratio of 54.1%; particles of 500 to 300 μm in the ratio of 29.9%; particles of 300 to 150 μm in the ratio of 14.2%; and particles of not larger than 150 μm in the ratio of 1.8%. In addition, the solid content and the bulk density of the crosslinked polymer particles (A4) were measured, and their results are shown in Table 1.

COMPARATIVE EXAMPLE A-2

Figure 2:
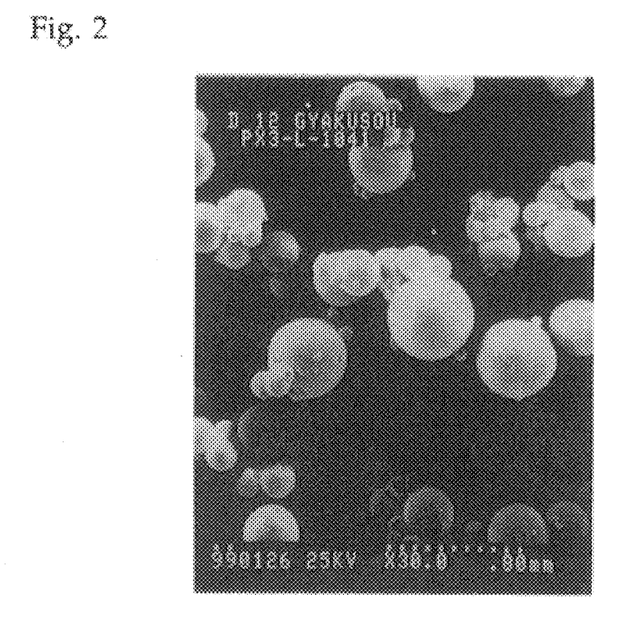
FIG. 2 is an electron photomicrograph (magnifications: 30.0) of the crosslinked polymer particles (A5) as obtained in Comparative Example A-2.

First, 600 ml of cyclohexane solution, containing 6 g of inorganic fine particles (trade name: Aerosil R972, produced by Nippon Aerosil Co., Ltd.), was placed into a separable flask of 2 liters with a dropping funnel, a stirrer, a thermometer, a reflux condenser, and a built-in baffle, and then stirred at room temperature. Next, 21.8 g of 50% aqueous solution of ethylene glycol diglycidyl ether (trade name: Denacol EX-810, produced by Nagase Chemicals, Ltd.) (as the crosslinking agent) was added under stirring to an aqueous hydrophilic high-molecular compound solution having been cooled to 0° C. beforehand and comprising 337.3 g of 30% polyethylenimine (trade name: Epomin P1000, produced by Nippon Shokubai Co., Ltd.) and 102.5 g of pure water, thus preparing an aqueous liquid containing a crosslinking agent and a hydrophilic high-molecular compound. Then, this solution was added to the above cyclohexane solution at room temperature under stirring. Under stirring, the temperature of the system was gradually raised to 65° C., and the reaction was carried out at 65° C. for 3 hours. Then, the temperature of the system was cooled to room temperature, and the resultant spherical hydrogel was filtrated by suction, and then not washed with water, but dried at 60° C. with hot air for 2 hours, thus obtaining cationic crosslinked polymer particles (A5). An electron photomicrograph of the crosslinked polymer particles (A5) is shown in FIG. 2. This crosslinked polymer particles (A5) exhibited an absorption capacity of 9.5 g/g for physiological saline solution without load. In addition, as to the crosslinked polymer particles (A5), the yield of particles of 850 to 150 μm was 99% of the charged raw materials. In addition, the crosslinked polymer particles (A5) comprised: particles of 850 to 500 μm in the ratio of 11.9%; particles of 500 to 300 μm in the ratio of 43.0%; particles of 300 to 150 μm in the ratio of 44.1%; and particles of not larger than 150 μm in the ratio of 1.0%. The solid content and the bulk density of the crosslinked polymer particles (A5) were measured, and their results are shown in Table 1.

REFERENTIAL EXAMPLE B-1

First, 70.00 parts of acrylic acid, 0.15 parts of N,N'-methylenebisacrylamide (copolymerizable crosslinking agent), and 275.32 parts of deionized water were mixed. The resultant mixture was degassed with nitrogen gas for 60 minutes and then put into an airtight vessel possible to open and close, and the displacement of the internal air of the reaction system with nitrogen was continued with the liquid temperature kept at 23° C. under the nitrogen atmosphere. Next, 2.12 parts of 10 weight % aqueous 2,2'-azobis(2-amidinopropane) dihydrochloride solution, 0.67 part of 10 weight % aqueous hydrogen peroxide solution, and 1.75 parts of 1 weight % aqueous L-ascorbic acid solution were added under stirring. As a result, after 3 minutes, a polymerization reaction got started, and after 25 minutes, the reaction system reached the peak temperature. Thirty minutes after the polymerization temperature reached its peak, the resultant crosslinked hydrogel polymer was got out and then caused to pass through a meat chopper, thus obtaining a crosslinked hydrogel polymer as finely divided. This polymer was dried in a hot-air drier of 150° C. for 1 hour. The resultant dried product was pulverized with a laboratory pulverizer, and the resultant pulverized product was sieved with a wire gauze of 850 μm in mesh opening size to separate what passed through it, thus obtaining anionic crosslinked polymer particles (B1). This crosslinked polymer particles (B1) exhibited an absorption capacity of 7.1 g/g for physiological saline solution without load. The crosslinked polymer particles (B1) comprised: particles of 850 to 500 μm in the ratio of 33.7%; particles of 500 to 300 μm in the ratio of 45.3%; particles of 300 to 150 μm in the ratio of 19.8%; and particles of not larger than 150 μm in the ratio of 1.2%.

REFERENTIAL EXAMPLE B-2

First, 70.00 parts of acrylic acid, 0.30 parts of N,N'-methylenebisacrylamide (copolymerizable crosslinking agent), and 275.17 parts of deionized water were mixed. The resultant mixture was degassed with nitrogen gas for 60 minutes and then put into an airtight vessel possible to open and close, and the displacement of the internal air of the reaction system with nitrogen was continued with the liquid temperature kept at 23° C. under the nitrogen atmosphere. Next, 2.12 parts of 10 weight % aqueous 2,2'-azobis(2-amidinopropane) dihydrochloride solution, 0.67 part of 10 weight % aqueous hydrogen peroxide solution, and 1.75 parts of 1 weight % aqueous L-ascorbic acid solution were added under stirring. As a result, after 3 minutes, a polymerization reaction got started, and after 25 minutes, the reaction system reached the peak temperature. Thirty minutes after the polymerization temperature reached its peak, the resultant crosslinked hydrogel polymer was got out and then caused to pass through a meat chopper, thus obtaining a crosslinked hydrogel polymer as finely divided. This polymer was dried in a hot-air drier of 150° C. for 1 hour. The resultant dried product was pulverized with a laboratory pulverizer, and the resultant pulverized product was sieved with a wire gauze of 850 μm in mesh opening size to separate what passed through it, thus obtaining anionic crosslinked polymer particles (B2). This crosslinked polymer particles (B2) exhibited an absorption capacity of 5.9 g/g for physiological saline solution without load. The crosslinked polymer particles (B2) comprised: particles of 850 to 500 μm in the ratio of 39.0%; particles of 500 to 300 μm in the ratio of 39.0%; particles of 300 to 150 μm in the ratio of 21.8%; and particles of not larger than 150 μm in the ratio of 0.2%.

REFERENTIAL EXAMPLE B-3

First, 70.00 parts of acrylic acid, 0.45 parts of N,N'-methylenebisacrylamide (copolymerizable crosslinking agent), and 274.99 parts of deionized water were mixed. The resultant mixture was degassed with nitrogen gas for 60 minutes and then put into an airtight vessel possible to open and close, and the displacement of the internal air of the reaction system with nitrogen was continued with the liquid temperature kept at 23° C. under the nitrogen atmosphere. Next, 2.12 parts of 10 weight % aqueous 2,2'-azobis(2-amidinopropane) dihydrochloride solution, 0.70 part of 10 weight % aqueous hydrogen peroxide solution, and 1.75 parts of 1 weight % aqueous L-ascorbic acid solution were added under stirring. As a result, after 3 minutes, a polymerization reaction got started, and after 25 minutes, the reaction system reached the peak temperature. Thirty minutes after the polymerization temperature reached its peak, the resultant crosslinked hydrogel polymer was got out and then caused to pass through a meat chopper, thus obtaining a crosslinked hydrogel polymer as finely divided. This polymer was dried in a hot-air drier of 150° C. for 1 hour. The resultant dried product was pulverized with a laboratory pulverizer, and the resultant pulverized product was sieved with a wire gauze of 850 μm in mesh opening size to separate what passed through it, thus obtaining anionic crosslinked polymer particles (B3). This crosslinked polymer particles (B3) exhibited an absorption capacity of 5.6 g/g for physiological saline solution without load. The crosslinked polymer particles (B3) comprised: particles of 850 to 500 μm in the ratio of 34.1%; particles of 500 to 300 μm in the ratio of 42.5%; particles of 300 to 150 μm in the ratio of 22.1%; and particles of not larger than 150 μm in the ratio of 1.3%. In addition, the solid content and the bulk density were measured, and their results are shown in Table 1.

REFERENTIAL EXAMPLE B-4

First, 70.00 parts of acrylic acid, 0.60 parts of N,N'-methylenebisacrylamide (copolymerizable crosslinking agent), and 274.84 parts of deionized water were mixed. The resultant mixture was degassed with nitrogen gas for 60 minutes and then put into an airtight vessel possible to open and close, and the displacement of the internal air of the reaction system with nitrogen was continued with the liquid temperature kept at 23° C. under the nitrogen atmosphere. Next, 2.12 parts of 10 weight % aqueous 2,2'-azobis(2-amidinopropane) dihydrochloride solution, 0.7 part of 10 weight % aqueous hydrogen peroxide solution, and 1.75 parts of 1 weight % aqueous L-ascorbic acid solution were added under stirring. As a result, after 3 minutes, a polymerization reaction got started, and after 25 minutes, the reaction system reached the peak temperature. Thirty minutes after the polymerization temperature reached its peak, the resultant crosslinked hydrogel polymer was got out and then caused to pass through a meat chopper, thus obtaining a crosslinked hydrogel polymer as finely divided. This polymer was dried in a hot-air drier of 150° C. for 1 hour. The resultant dried product was pulverized with a laboratory pulverizer, and the resultant pulverized product was sieved with a wire gauze of 850 μm in mesh opening size to separate what passed through it, thus obtaining anionic crosslinked polymer particles (B4). This crosslinked polymer particles (B4) exhibited an absorption capacity of 5.2 g/g for physiological saline solution without load. The crosslinked polymer particles (B4) comprised: particles of 850 to 500 μm in the ratio of 36.3%; particles of 500 to 300 μm in the ratio of 42.5%; particles of 300 to 150 μm in the ratio of 20.3%; and particles of not larger than 150 μm in the ratio of 0.9%.

TABLE 1

| | Crosslinked polymer particles | Particle diameter (μm) | Solid content (%) | Bulk density (g/ml) |
|---|---|---|---|---|
| Example A-1 | (A1) | 850 to 500 | 88.6 | 0.393 |
| | | 500 to 300 | 87.4 | 0.353 |
| | | 300 to 150 | 86.6 | 0.314 |
| | | Whole (not larger than 850) | 87.3 | 0.310 |
| Example A-2 | (A2) | 850 to 500 | 85.8 | 0.237 |
| | | 500 to 300 | 85.9 | 0.252 |
| | | 300 to 150 | 85.5 | 0.260 |
| | | Whole (not larger than 850) | 85.7 | 0.257 |
| Example A-3 | (A3) | 850 to 500 | 90.9 | 0.269 |
| | | 500 to 300 | 90.9 | 0.281 |
| | | 300 to 150 | 90.9 | 0.314 |
| | | Whole (not larger than 850) | 90.9 | 0.297 |
| Comparative Example A-1 | (A4) | 850 to 500 | 87.3 | 0.610 |
| | | 500 to 300 | 87.1 | 0.617 |
| | | 300 to 150 | 85.9 | 0.634 |
| | | Whole (not larger than 850) | 86.3 | 0.625 |
| Comparative Example A-2 | (A5) | 850 to 500 | 85.4 | 0.660 |
| | | 500 to 300 | 85.3 | 0.601 |
| | | 300 to 150 | 84.8 | 0.644 |
| | | Whole (not larger than 850) | 85.1 | 0.654 |
| Referential Example B-3 | (B3) | 850 to 500 | 98.4 | 0.620 |
| | | 500 to 300 | 98.4 | 0.616 |
| | | 300 to 150 | 98.1 | 0.610 |
| | | Whole (not larger than 850) | 98.3 | 0.625 |

EXAMPLES 1 TO 4

Figure 3:
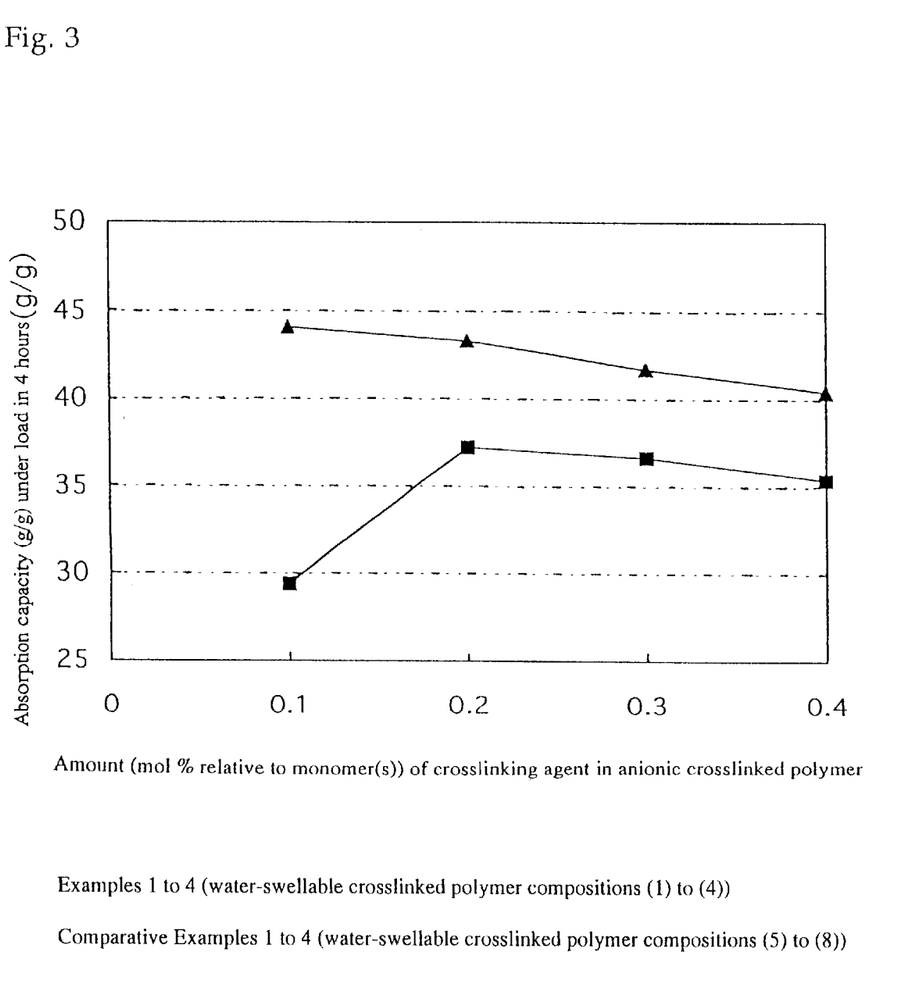
FIG. 3 shows the absorption capacities under load in 4 hours of the water-swellable crosslinked polymer compositions (1) to (8) as obtained in Examples 1 to 4 and Comparative Examples 1 to 4.
Figure 4:
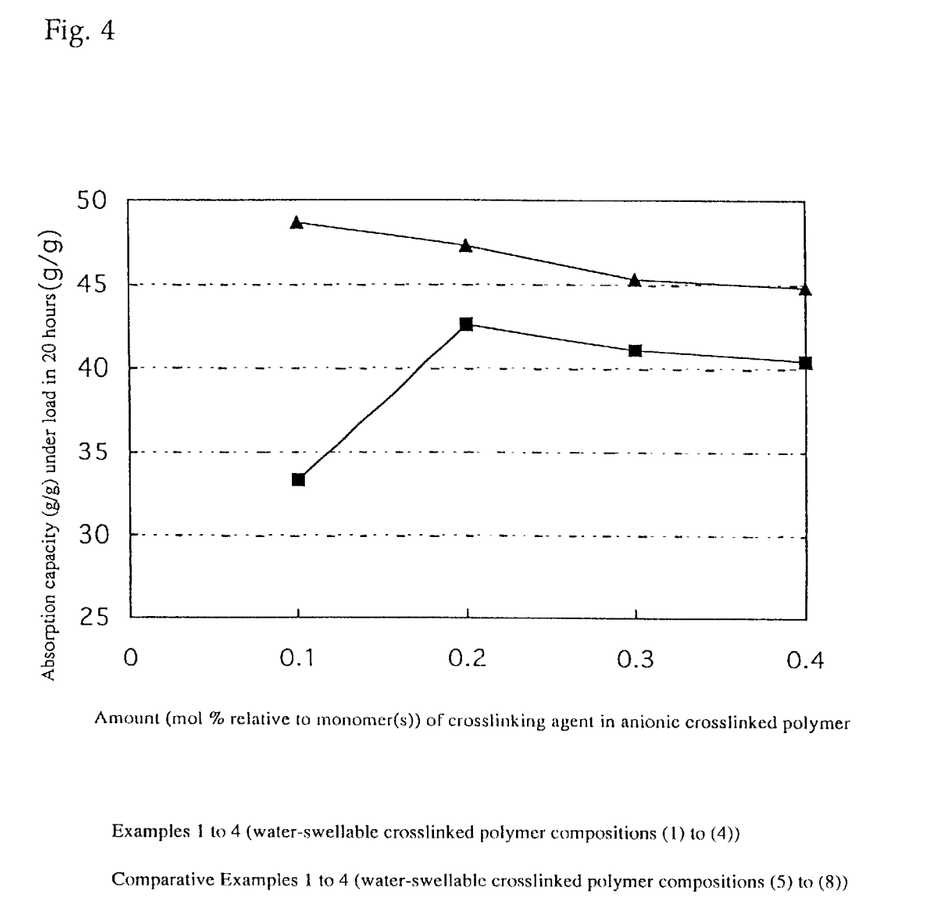
FIG. 4 shows the absorption capacities under load in 20 hours of the water-swellable crosslinked polymer compositions (1) to (8) as obtained in Examples 1 to 4 and Comparative Examples 1 to 4.

One hundred weight parts of particles, having particle diameters in the range of 500 to 300 μm, of the cationic crosslinked polymer particles (A3) were dry-blended with 100 weight parts of anionic crosslinked polymer particles (B1), (B2), (B3), and (B4) (having particle diameters of not larger than 850 μm) respectively, thus obtaining 200 weight parts of particulate water-swellable crosslinked polymer compositions (1), (2), (3), and (4) respectively. Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load in 4 hours and in 20 hours are shown in Table 2. Their results are shown in FIGS. 3 and 4. FIG. 3 shows the absorption capacities under load in 4 hours, and FIG. 4 shows the absorption capacities under load in 20 hours.

COMPARATIVE EXAMPLES 1 TO 4

One hundred weight parts of particles, having particle diameters in the range of 500 to 300 μm, of the cationic crosslinked polymer particles (A4) were dry-blended with 100 weight parts of anionic crosslinked polymer particles (B1), (B2), (B3), and (B4) (having particle diameters of not larger than 850 μm) respectively, thus obtaining 200 weight parts of particulate water-swellable crosslinked polymer compositions (5), (6), (7), and (8) respectively. Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load in 4 hours and in 20 hours are shown in Table 3. Their results are shown in FIGS. 3 and 4. FIG. 3 shows the absorption capacities in 4 hours, and FIG. 4 shows the absorption capacities in 20 hours.

TABLE 2

| | Water-swellable crosslinked polymer composition | Cationic crosslinked polymer particles | Anionic crosslinked polymer particles | Bulk density (g/ml) | Absorption capacity (g/g) under load | |
|---|---|---|---|---|---|---|
| | | | | | 4 hours | 20 hours |
| Example 1 | (1) | (A3) | (B1) | 0.395 | 44.1 | 48.7 |
| Example 2 | (2) | (A3) | (B2) | 0.386 | 43.3 | 47.3 |
| Example 3 | (3) | (A3) | (B3) | 0.397 | 41.7 | 45.3 |
| Example 4 | (4) | (A3) | (B4) | 0.381 | 40.4 | 44.8 |

TABLE 3

| | Water-swellable crosslinked polymer composition | Cationic crosslinked polymer particles | Anionic crosslinked polymer particles | Bulk density (g/ml) | Absorption capacity (g/g) under load | |
|---|---|---|---|---|---|---|
| | | | | | 4 hours | 20 hours |
| Comparative Example 1 | (5) | (A4) | (B1) | 0.612 | 29.4 | 33.3 |
| Comparative Example 2 | (6) | (A4) | (B2) | 0.605 | 37.3 | 42.6 |
| Comparative Example 3 | (7) | (A4) | (B3) | 0.597 | 36.7 | 41.1 |
| Comparative Example 4 | (8) | (A4) | (B4) | 0.610 | 35.4 | 40.4 |

As is shown in Tables 2 and 3, the absorption capacities under load in 4 hours and in 20 hours are higher in Examples 1 to 4 in which a cationic crosslinked polymer having a bulk density of not more than 0.5 g/ml was used than in Comparative Examples 1 to 4 in which a cationic crosslinked polymer having a bulk density of more than 0.5 g/ml was used. That the absorption capacity under load in 4 hours is high means that the saltwater absorption rate is fast. The absorption capacity under load in 20 hours indicates almost the saturated value, therefore that this is high means that the saturated absorption capacity value (absorption quantity) under load is high.

EXAMPLES 5 AND 6

The particulate water-swellable crosslinked polymer compositions (1) and (3) resultant from Examples 1 and 3 respectively were measured by the absorption capacities of the upper, intermediate, and lower layers of the gel under load in 4 hours and the absorption efficiency under load in 4 hours. Their results are shown in Table 4.

COMPARATIVE EXAMPLES 5 AND 6

The particulate water-swellable crosslinked polymer compositions (5) and (7) resultant from Comparative Examples 1 and 3 respectively were measured by the absorption capacities of the upper, intermediate, and lower layers of the gel under load in 4 hours and the absorption efficiency under load in 4 hours. Their results are shown in Table 4.

TABLE 4

|  | Water-swellable crosslinked polymer composition | Absorption capacity (g/g) of upper layer of gel | Absorption capacity (g/g) of intermediate layer of gel | Absorption capacity (g/g) of lower layer of gel | Absorption efficiency under load |
|---|---|---|---|---|---|
| Example 5 | (1) | 51.6 | 49.1 | 27.4 | 1.88 |
| Example 6 | (3) | 48.1 | 46.3 | 30.1 | 1.60 |
| Comparative Example 5 | (5) | 30.8 | 28.8 | 27.6 | 1.12 |
| Comparative Example 6 | (7) | 35.4 | 42.9 | 33.3 | 1.06 |

As is shown in Table 4, the absorption efficiency under load is higher in Examples 5 and 6 in which a cationic crosslinked polymer having a bulk density of not more than 0.5 g/ml was used than in Comparative Examples 5 and 6 in which a cationic crosslinked polymer having a bulk density of more than 0.5 g/ml was used. This indicates that the liquid permeability from the lower layer (which is the closest to the liquid-absorbed portion) to the upper layer (which is the farthest from the liquid-absorbed portion) is high, wherefrom it would be understood that efficient water absorption was made.

EXAMPLE 7

Particles having particle diameters in the range of 850 to 500 μm, particles having particle diameters in the range of 500 to 300 μm, and particles having particle diameters of not larger than 300 μm, of the cationic crosslinked polymer particles (A3), were dry-blended in an amount of 100 weight parts respectively with 100 weight parts of anionic crosslinked polymer particles (B3) (having particle diameters of not larger than 850 μm), thus obtaining 200 weight parts of particulate water-swellable crosslinked polymer compositions (9) to (11) respectively. Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load (in 0.083 hour, in 0.5 hour, in 1 hour, in 4 hours, and in 20 hours) are shown in Table 5.

COMPARATIVE EXAMPLE 7

Particles having particle diameters in the range of 850 to 500 μm, particles having particle diameters in the range of 500 to 300 μm, and particles having particle diameters of not larger than 300 μm, of the cationic crosslinked polymer particles (A4), were dry-blended in an amount of 100 weight parts respectively with 100 weight parts of anionic crosslinked polymer particles (B3) (having particle diameters of not larger than 850 μm), thus obtaining 200 weight parts of particulate water-swellable crosslinked polymer compositions (12) to (14) respectively. Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load (in 0.083 hour, in 0.5 hour, in 1 hour, in 4 hours, and in 20 hours) are shown in Table 5.

TABLE 5

|  |  | Comparative Example 7 | | | Example 7 | | |
|---|---|---|---|---|---|---|---|
| Particle diameter (μm) | | 850 to 500 | 500 to 300 | Not larger than 300 | 850 to 500 | 500 to 300 | Not larger than 300 |
| Water-swellable crosslinked polymer composition | | (9) | (10) | (11) | (12) | (13) | (14) |
| Absorption capacity (g/g) under load | 0.083 hr | 7.3 | 9.4 | 11.8 | 12.0 | 15.1 | 15.9 |
| | 0.5 hr | 15.8 | 20.5 | 21.8 | 23.7 | 27.8 | 28.6 |
| | 1 hr | 21.0 | 26.6 | 26.0 | 28.5 | 33.3 | 33.5 |
| | 4 hr | 31.4 | 36.7 | 36.9 | 36.6 | 41.7 | 40.5 |
| | 20 hr | 38.3 | 41.1 | 39.8 | 40.4 | 45.3 | 43.2 |

As is shown in Table 5, in the case where the bulk density is more than 0.5 g/ml, a small particle diameter involves enlarging the surface area, therefore resulting in a fast absorption rate (high absorption capacity in a short period of time), but rather lowering the saturated absorption capacity value (absorption capacity in 20 hours). On the other hand, in the case where the bulk density is not more than 0.5 g/ml, the absorption rate is fast (the absorption capacity in a short period of time is high), and further, the saturated absorption capacity value (absorption capacity in 20 hours) is high. It is inferred that the reason why the absorption rate is fast is because the internal surface area is large, and that the reason why the saturated absorption capacity value is high is because the liquid permeability in the initial stage of the water absorption is high.

EXAMPLES 8 TO 11

The cationic crosslinked polymer particles (A1) and (A2) having particle diameters of not larger than 850 μm were dry-blended in an amount of 100 weight parts respectively with 100 weight parts of anionic crosslinked polymer particles (B1) and (B3) (having particle diameters of not larger than 850 μm) respectively, thus obtaining 200 weight parts of particulate water-swellable crosslinked polymer compositions (15) to (18) respectively. Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load in 4 hours and in 20 hours are shown in Table 6.

COMPARATIVE EXAMPLES 8 AND 9

The cationic crosslinked polymer particles (A5) having particle diameters of not larger than 850 μm were dry-blended in an amount of 100 weight parts with 100 weight parts of anionic crosslinked polymer particles (B1) and (B3) (having particle diameters of not larger than 850 μm) respectively, thus obtaining 200 weight parts of particulate water-swellable crosslinked polymer compositions (19) and (20) respectively. Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load in 4 hours and in 20 hours are shown in Table 6.

TABLE 6

| | Water-swellable cross-linked polymer composition | Cationic cross-linked polymer particles | Anionic cross-linked polymer particles | Bulk density (g/ml) | Absorption capacity (g/g) under load | |
|---|---|---|---|---|---|---|
| | | | | | 4 hours | 20 hours |
| Example 8 | (15) | (A1) | (B1) | 0.383 | 42.5 | 46.0 |
| Example 9 | (16) | (A1) | (B3) | 0.399 | 42.1 | 45.2 |
| Example 10 | (17) | (A2) | (B1) | 0.373 | 41.4 | 44.6 |
| Example 11 | (18) | (A2) | (B3) | 0.365 | 40.0 | 43.1 |
| Comparative Example 8 | (19) | (A5) | (B1) | 0.621 | 29.0 | 34.4 |
| Comparative Example 9 | (20) | (A5) | (B3) | 0.611 | 37.6 | 42.0 |

As is shown in Table 6, the absorption capacities under load in 4 hours and in 20 hours are higher in Examples 8 to 11 in which cationic crosslinked polymers having a bulk density of not more than 0.5 g/ml were used than in Comparative Examples 8 and 9 in which a cationic crosslinked polymer having a bulk density of more than 0.5 g/ml was used. That the absorption capacity under load in 4 hours is high means that the saltwater absorption rate is fast. The absorption capacity under load in 20 hours indicates almost the saturated value, therefore that this is high means that the saturated absorption capacity value (absorption quantity) under load is high.

EXAMPLES 12 AND 13

The cationic crosslinked polymer particles (A1) and (A3) having particle diameters of not larger than 850 μm were dry-blended in an amount of 40 weight parts respectively with 60 weight parts of anionic crosslinked polymer particles (B3) (having particle diameters of not larger than 850 μm), thus obtaining 100 weight parts of particulate water-swellable crosslinked polymer compositions (21) and (22) respectively. Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load in 4 hours and in 20 hours are shown in Table 7.

COMPARATIVE EXAMPLE 10

The cationic crosslinked polymer particles (A5) having particle diameters of not larger than 850 μm were dry-blended in an amount of 40 weight parts with 60 weight parts of anionic crosslinked polymer particles (B3) (having particle diameters of not larger than 850 μm), thus obtaining 100 weight parts of particulate water-swellable crosslinked polymer composition (23). Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load in 4 hours and in 20 hours are shown in Table 7.

TABLE 7

| | Water-swellable cross-linked polymer composition | Cationic cross-linked polymer particles | Anionic cross-linked polymer particles | Bulk density (g/ml) | Absorption capacity (g/g) under load | |
|---|---|---|---|---|---|---|
| | | | | | 4 hours | 20 hours |
| Example 12 | (21) | (A1) | (B3) | 0.431 | 40.5 | 44.2 |
| Example 13 | (22) | (A3) | (B3) | 0.433 | 40.7 | 44.5 |
| Comparative Example 10 | (23) | (A5) | (B3) | 0.623 | 37.1 | 41.3 |

As is shown in Table 7, the absorption capacities under load in 4 hours and in 20 hours are higher in Examples 12 and 13 in which cationic crosslinked polymers having a bulk density of not more than 0.5 g/ml were used than in Comparative Example 10 in which a cationic crosslinked polymer having a bulk density of more than 0.5 g/ml was used. That the absorption capacity under load in 4 hours is high means that the saltwater absorption rate is fast. The absorption capacity under load in 20 hours indicates almost the saturated value, therefore that this is high means that the saturated absorption capacity value (absorption quantity) under load is high.

REFERENTIAL EXAMPLE C-1

An aqueous monomer solution was prepared by dissolving 270 g of acrylic acid, 0.4 g of N,N'-methylenebisacrylamide, 0.547 g of sodium persulfate, and 0.157 g of 2-hydroxy-2-methylpropiophenone into 810 g of deionized water, and then degassed by blowing nitrogen in for 15 minutes. This aqueous monomer solution was poured into a shallow glass dish, and then irradiated with ultraviolet rays of 15 mW/cm$^2$ for 25 minutes to carry out polymerization, thus obtaining a crosslinked polyacrylic acid gel.

COMPARATIVE EXAMPLE 11

Ethylene glycol diglycidyl ether (trade name: "Denacol EX-810," produced by Nagase Chemicals, Ltd.) was added, in the ratio of 1.5 mol %, to an aqueous polyethylenimine solution (trade name: "EPOMIN P-1000," produced by Nippon Shokubai Co., Ltd.), as diluted to 10%, to carry out a reaction at 60° C. for 16 hours, thus obtaining a crosslinked polyethylenimine gel. Then, 37.4 parts (in terms of solid content) of the resultant crosslinked polyethylenimine gel and 62.6 parts (in terms of solid content) of the crosslinked polyacrylic acid gel, as obtained in Referential Example C-1, were separately pulverized into fine pieces in extruders, and then mixed. The resultant mixture was caused to twice pass through a meat chopper, thus obtaining a kneaded product in which both gels were uniformly kneaded and the soft gels were co-formed into a microdomain. The resultant kneaded product was dried at 60° C. in an oven for 16 hours. Inorganic fine particles (trade name: "Aerosil A-200," produced by Nippon Aerosil Co., Ltd.) were added to the resultant dried product in the ratio of 0.5% (relative to the dried product), and the resultant mixture was freeze-dried to separate particles of 850 to 150 μm, thus obtaining a water-swellable crosslinked polymer composition (24).

This composition had a bulk density of 0.55 g/ml and exhibited a desalting amount of 0.29 g/g, and further exhibited absorption capacities of 18.9 g/g, 25.6 g/g, and 29.6 g/g under load (under a load of 50 g/cm$^2$) in 1 hour, in 4 hours, and in 20 hours respectively.

COMPARATIVE EXAMPLE 12

Ethylene glycol diglycidyl ether (trade name: "Denacol EX-810," produced by Nagase Chemicals, Ltd.) was added, in the ratio of 1.0 mol %, to an aqueous polyethylenimine solution (trade name: "EPOMIN P-1000," produced by Nippon Shokubai Co., Ltd.), as diluted to 20%, to carry out a reaction at 60° C. for 16 hours, thus obtaining a crosslinked polyethylenimine gel. Then, 37.4 parts (in terms of solid content) of the resultant crosslinked polyethylenimine gel and 62.6 parts (in terms of solid content) of the crosslinked polyacrylic acid gel, as obtained in Referential Example C-1, were separately pulverized into fine pieces in extruders, and then mixed. The resultant mixture was caused to twice pass through a meat chopper, thus obtaining a kneaded product in which both gels were uniformly kneaded and the soft gels were co-formed into a microdomain. The resultant kneaded product was dried at 60° C. in an oven for 16 hours. Inorganic fine particles (trade name: "Aerosil A-200," produced by Nippon Aerosil Co., Ltd.) were added to the resultant dried product in the ratio of 0.5% (relative to the dried product), and the resultant mixture was freeze-dried to separate particles of 850 to 150 μm, thus obtaining a water-swellable crosslinked polymer composition (25).

This composition had a bulk density of 0.53 g/ml and exhibited a desalting amount of 0.29 g/g, and further exhibited absorption capacities of 25.8 g/g, 31.5 g/g, and 31.3 g/g under load (under a load of 50 g/cm$^2$) in 1 hour, in 4 hours, and in 20 hours respectively.

EXAMPLE 14

The particulate water-swellable crosslinked polymer composition (21), as obtained in Example 12, had a bulk density of 0.431 g/ml and exhibited a desalting amount of 0.41 g/g, and further exhibited absorption capacities of 33.5 g/g, 40.5 g/g, and 44.2 g/g under load (under a load of 50 g/cm$^2$) in 1 hour, in 4 hours, and in 20 hours respectively.

As is clear from the comparison of Comparative Examples 11 and 12 with Example 14, the water-swellable crosslinked polymer composition according to the present invention, as obtained by dry-blending, exhibited a more excellent value in respect to each of the desalting amount and the absorption capacity under load than the compositions in which a microdomain was formed.

EXAMPLE 15

First, 1,000 g of a 50 weight % aqueous polyethylenimine solution (weight-average molecular weight: about 70,000, aqueous solution viscosity: about 17,000 mPa·s, trade name: Epomin P-1050, produced by Nippon Shokubai Co., Ltd.) was placed into a beaker of 2 liters. Next, while being whipped, this aqueous polymer solution was stirred until it became clouded. Thereafter, 50 g of ethylene glycol diglycidyl ether (trade name: Denacol EX-810, produced by Nagase Chemicals, Ltd.) (crosslinking agent) was added thereto to mix them until a homogeneous solution was formed. The resultant mixed solution was placed into an incubator of 60° C. to carry out a crosslinking reaction. As a result, gelation began after about 1 minute, and the aqueous solution became solidified after 5 minutes. Then, after 1 hour, the resultant solid was got out and then cooled to examine its volume. Its result showed that the volume had increased by 0.6% of the volume of the original solution due to bubbles-containing. Then, the resultant lumped gel was got out, and then pulverized with a laboratory pulverizer into particle diameters of not larger than 850 μm, and then dried with a drying oven of 60° C. for 2 hours. Then, 1.5 g of inorganic fine particles (trade name: Aerosil R972, produced by Nippon Aerosil Co., Ltd.) were added to the resultant dried particles, and the resultant blend was pulverized with a laboratory pulverizer, thus obtaining water-swellable crosslinked polymer particles (A6) having particle diameters of not larger than 850 μm. The water-swellable crosslinked polymer particles (A6) exhibited an absorption capacity of 6.2 g/g for physiological saline solution without load and had a bulk density of 0.287 g/ml.

EXAMPLE 16

First, 1,000 g of polyethylenimine (weight-average molecular weight: about 10,000, viscosity: about 20,000 mPa·s, trade name: Epomin SP-200, produced by Nippon Shokubai Co., Ltd.) of 40° C. was placed into a beaker of 2 liters. Next, while being whipped, this polymer was stirred until it became clouded. Thereafter, 100 g of ethylene glycol diglycidyl ether (trade name: Denacol EX-810, produced by Nagase Chemicals, Ltd.) (crosslinking agent) was added thereto to mix them until a homogeneous mixture was formed. The resultant mixture was placed into an incubator of 60° C. to carry out a crosslinking reaction. As a result, gelation began after about 2 minutes, and the reaction mixture became solidified after 6 minutes. Then, after 1 hour, the resultant solid was got out and then cooled to examine its volume. Its result showed that the volume had increased by about 1.1% of the volume of the original mixture due to bubbles-containing. Then, the resultant lumped gel was got out, and then pulverized with a laboratory pulverizer into particle diameters of not larger than 850 μm, and thereto 3 g of inorganic fine particles (trade name: Aerosil R972, produced by Nippon Aerosil Co., Ltd.) were added, and the resultant blend was pulverized with a laboratory pulverizer, thus obtaining water-swellable crosslinked polymer particles (A7) having particle diameters of not larger than 850 μm. The water-swellable crosslinked polymer particles (A7) exhibited an absorption capacity of 6.1 g/g for physiological saline solution without load and had a bulk density of 0.254 g/ml.

EXAMPLE 17

First, a mixture of polyethylenimine and a crosslinking agent was prepared in the same way as of Example 16 except that the crosslinking agent was changed to 75 g of acrylic acid. Next, the resultant mixture was placed into an incubator of 160° C. to carry out a crosslinking reaction. As a result, gelation began after about 20 minutes, and the reaction mixture became solidified after 30 minutes. Then, after 1 hour, the resultant lumped gel was got out, and then pulverized with a laboratory pulverizer into particle diameters of not larger than 850 μm, and thereto 3 g of inorganic fine particles (trade name: Aerosil R972, produced by Nippon Aerosil Co., Ltd.) were added, and the resultant blend was pulverized with a laboratory pulverizer, thus obtaining water-swellable crosslinked polymer particles (A8) having particle diameters of not larger than 850 μm. The water-swellable crosslinked polymer particles (A8) exhibited an absorption capacity of 5.2 g/g for physiological saline solution without load and had a bulk density of 0.272 g/ml.

EXAMPLE 18

Mixing of the crosslinking agent was carried out in the same way as of Example 16, and then the resultant mixture was placed into a vacuum oven of 60° C. to carry out a crosslinking reaction while the bubbles in the mixture were expanded under vacuum of 200 to 0.1 mmHg. As a result, gelation began after about 2 minutes, and the reaction mixture became solidified after 6 minutes. Then, after 1 hour, the resultant solid was got out and then cooled to examine its volume. Its result showed that the volume had increased by about 200% of the volume of the original mixture due to bubbles-containing. Then, the resultant lumped gel was got out, and then pulverized with a laboratory pulverizer into particle diameters of not larger than 850 μm, and thereto 3 g of inorganic fine particles (trade name: Aerosil R972, produced by Nippon Aerosil Co., Ltd.) were added, and the resultant blend was pulverized with a laboratory pulverizer, thus obtaining water-swellable crosslinked polymer particles (A9) having particle diameters of not larger than 850 μm. The water-swellable crosslinked polymer particles (A9) exhibited an absorption capacity of 7.7 g/g for physiological saline solution without load and had a bulk density of 0.211 g/ml.

EXAMPLES 19 TO 22

Acid-Base Mixed Composition

The cationic water-swellable crosslinked polymer particles (A6) to (A9) having particle diameters in the range of 500 to 300 μm were dry-blended in an amount of 100 weight parts respectively with 100 weight parts of anionic water-swellable crosslinked polymer particles (B2) having particle diameters of not larger than 850 μm, thus obtaining 200 weight parts of particulate water-swellable crosslinked polymer compositions (24) to (27) respectively. Their absorption capacities for a salt water (1,000 g in total weight as prepared by adding deionized water (solvent) to 2.0 g of potassium chloride, 2.0 g of sodium sulfate, 0.85 g of ammonium dihydrogenphosphate, 0.15 g of diammonium hydrogenphosphate, 0.25 g of calcium chloride dihydrate, and 0.5 g of magnesium chloride hexahydrate) under load in 4 hours and in 20 hours are shown in Table 8.

TABLE 8

| | Water-swellable crosslinked polymer composition | Cationic crosslinked polymer particles | Anionic crosslinked polymer particles | Bulk density (g/ml) | Absorption capacity (g/g) under load | |
|---|---|---|---|---|---|---|
| | | | | | 4 hours | 20 hours |
| Example 19 | (24) | (A6) | (B2) | 0.383 | 41.2 | 47.5 |
| Example 20 | (25) | (A7) | (B2) | 0.389 | 41 | 45.2 |
| Example 21 | (26) | (A8) | (B2) | 0.412 | 40.3 | 44.2 |
| Example 22 | (27) | (A9) | (B2) | 0.352 | 40.5 | 42.3 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A water-swellable crosslinked polymer composition, which is particulate and comprises an anionic crosslinked polymer and a cationic crosslinked polymer, with the water-swellable crosslinked polymer composition being characterized by having a bulk density of not more than 0.5 g/ml.

2. A water-swellable crosslinked polymer composition, which is particulate and comprises an anionic crosslinked polymer and a cationic crosslinked polymer, with the water-swellable crosslinked polymer composition being characterized in that at least either one of the anionic crosslinked polymer and the cationic crosslinked polymer has a bulk density of not more than 0.5 g/ml.

3. A water-swellable crosslinked polymer composition according to claim 1, wherein 50 to 100 mol % of acid groups which are contained in functional groups in the anionic crosslinked polymer are unneutralized acid groups, and wherein 50 to 100 mol % of basic groups which are contained in functional groups in the cationic crosslinked polymer are unneutralized basic groups.

4. A water-swellable crosslinked polymer composition according to claim 2, wherein 50 to 100 mol % of acid groups which are contained in functional groups in the anionic crosslinked polymer are unneutralized acid groups, and wherein 50 to 100 mol % of basic groups which are contained in functional groups in the cationic crosslinked polymer are unneutralized basic groups.

5. A water-swellable crosslinked polymer composition according to claim 1, wherein the cationic crosslinked polymer is a crosslinked polymer of polyethylenimine.

6. A water-swellable crosslinked polymer composition according to claim 2, wherein the cationic crosslinked polymer is a crosslinked polymer of polyethylenimine.

7. A water-swellable crosslinked polymer composition according to claim 5, wherein the crosslinked polymer of polyethylenimine is a crosslinked polymer which is a product by a process including the step of crosslinking a polymer of polyethylenimine having a solid content of not less than 80 weight %.

8. A water-swellable crosslinked polymer composition according to claim 6, wherein the crosslinked polymer of polyethylenimine is a crosslinked polymer which is a product by a process including the step of crosslinking a polymer of polyethylenimine having a solid content of not less than 80 weight %.

9. A water-swellable crosslinked polymer composition according to claim 1, which is a product by a process including the step of dry-blending an anionic crosslinked polymer having a solid content of more than 80 weight % and a cationic crosslinked polymer having a solid content of more than 80 weight %.

10. A water-swellable crosslinked polymer composition according to claim 2, which is a product by a process including the step of dry-blending an anionic crosslinked polymer having a solid content of more than 80 weight % and a cationic crosslinked polymer having a solid content of more than 80 weight %.

11. A water-swellable crosslinked polymer composition according to claim 1, wherein the cationic crosslinked polymer is a product by a process including the step of carrying out a reaction between a water-soluble polymer and a crosslinking agent under bubbles-containing conditions.

12. A water-swellable crosslinked polymer composition according to claim 2, wherein the cationic crosslinked polymer is a product by a process including the step of carrying out a reaction between a water-soluble polymer and a crosslinking agent under bubbles-containing conditions.

13. A particulate cationic crosslinked polymer, which has a bulk density of not more than 0.5 g/ml and exhibits an absorption capacity of at least 5 g/g for physiological saline solution without load.

14. A particulate cationic crosslinked polymer according to claim 13, wherein the cationic crosslinked polymer is a crosslinked polymer of polyethylenimine.

15. A production process for a water-swellable crosslinked polymer, which comprises the step of carrying out a crosslinking reaction of a solution under bubbles-containing conditions wherein the solution contains at least a water-soluble polymer and a crosslinking agent.

16. A production process according to claim 15, wherein the water-soluble polymer is a polyamine.

17. A production process for a water-swellable crosslinked polymer composition, which comprises the steps of: carrying out a crosslinking reaction of a solution under bubbles-containing conditions to obtain a cationic crosslinked polymer wherein the solution contains at least a polyamine and a crosslinking agent; and then mixing the resultant cationic crosslinked polymer and an anionic crosslinked polymer together.

18. An absorbent articles, which comprises an absorbent layer, a sheet with liquid permeability, and a sheet with liquid impermeability, wherein the absorbent layer contains the water-swellable crosslinked polymer composition as recited in claim 1, and is interposed between the sheet with liquid permeability and the sheet with liquid impermeability.

19. An absorbent articles, which comprises an absorbent layer, a sheet with liquid permeability, and a sheet with liquid impermeability, wherein the absorbent layer contains the water-swellable crosslinked polymer composition as recited in claim 2, and is interposed between the sheet with liquid permeability and the sheet with liquid impermeability.

20. A particulate water-swellable crosslinked polymer composition, comprising an anionic crosslinked polymer, and a cationic polyethylenimine crosslinked polymer, wherein said cationic polyethylenimine crosslinked polymer is prepared by the process comprising the steps of:

pulverizing a polyethylenimine crosslinked polymer in a hydrogel state to form a pulverized polymer, mixing said pulverized polymer with an inorganic fine particle or a surfactant to form a mixture, and pulverizing said mixture to form said particulate water-swellable crosslinked polymer composition, wherein said composition has a bulk density of not more than 0.5 g/ml.

21. The particulate water-swellable crosslinked polymer of claim 20, further comprising the step of drying said pulverized polymer to form said dried pulverized polymer before said step of mixing said pulverized polymer with said inorganic fine particle or surfactant.

* * * * *